(12) United States Patent
Frielinghaus et al.

(10) Patent No.: US 11,317,765 B2
(45) Date of Patent: May 3, 2022

(54) WORK BASE AND SYSTEM

(71) Applicant: Vorwerk & Co. Interholding GmbH, Wuppertal (DE)

(72) Inventors: Robert Frielinghaus, Bochum (DE); Frank Starflinger, Bochum (DE); Andreas Heynen, Radevormwald (DE); Felix Thies, Wuppertal (DE); Kai Landsecker, Düsseldorf (DE); Philipp Charopoulos, Düsseldorf (DE); Niklas van Teeffelen, Düsseldorf (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 123 days.

(21) Appl. No.: 16/812,646

(22) Filed: Mar. 9, 2020

(65) Prior Publication Data

US 2020/0288917 A1 Sep. 17, 2020

(30) Foreign Application Priority Data

Mar. 15, 2019 (EP) .................................... 19163042

(51) Int. Cl.
*A47J 47/00* (2006.01)
*A47B 13/16* (2006.01)

(52) U.S. Cl.
CPC ............. *A47J 47/005* (2013.01); *A47B 13/16* (2013.01)

(58) Field of Classification Search
CPC ............................... A47J 47/005; A47B 13/16
See application file for complete search history.

(56) References Cited

U.S. PATENT DOCUMENTS

| 5,904,271 A | 5/1999 | Collins et al. | |
|---|---|---|---|
| D573,420 S * | 7/2008 | Pourounidis | D7/698 |
| 8,757,602 B2 | 6/2014 | Bagley | |
| 10,459,104 B2 | 10/2019 | Jurrens et al. | |
| 2009/0322004 A1 | 12/2009 | Young | |
| 2015/0076974 A1 | 3/2015 | Schreiter | |
| 2016/0331185 A1* | 11/2016 | Anderson | A47J 47/005 |
| 2018/0140141 A1* | 5/2018 | Russell | A47J 47/005 |
| 2018/0263425 A1 | 9/2018 | Dickie et al. | |

FOREIGN PATENT DOCUMENTS

| DE | 202006016445 U1 | 4/2007 | |
|---|---|---|---|
| EP | 2840932 B1 | 8/2016 | |
| WO | WO 97/40730 | 11/1997 | |
| WO | WO-2005004687 A1 * | 1/2005 | ............ A47J 47/005 |
| WO | WO 2015/100471 | 7/2015 | |

* cited by examiner

*Primary Examiner* — Nirvana Deonauth
(74) *Attorney, Agent, or Firm* — Jason H. Vick; Sheridan Ross, PC

(57) ABSTRACT

A work base with a holding device for suspending a vessel and a system with such a work base and a vessel are proposed, wherein the vessel is secured against being pulled out of the holding device.

20 Claims, 8 Drawing Sheets

WORK BASE AND SYSTEM

CROSS-REFERENCE TO RELATED APPLICATIONS

This application claims the benefit under 35 U.S.C. 119(a) to European Patent Application No. 19 163 042.5, filed Mar. 15, 2019, the disclosure of which is incorporated herein by reference in its entirety.

SUMMARY

The present technology relates to a work base and a system comprising a work base and a preferably pot-shaped vessel.

A work base in the sense of the present technology is preferably a plate-like or flat device which is used, for example, as a base for the preparation of food. In particular, a work base within the meaning of the present technology is a cutting board for cutting food. However, such a work base can in principle also be used for other purposes, for example as a base in laboratories.

In the context of the present technology, the terms "work base" and "cutting board" are used as synonyms.

EP 2 840 932 A1 discloses a work base which has an extendable holding device for a vessel, the holding device consisting of a U-shaped bracket attached to a bottom side of the work base. However, due to its design such a work base is thick and difficult to clean.

Against this background, one exemplary object of the technology is to provide an improved work base, wherein a simple, stable and/or compact structure and/or an easy, comfortable and/or hygienic use, in particular preparation of food, is enabled or supported.

The object of the technology is solved by a work base according to the claims herein. Advantageous further developments are the subject of the sub-claims.

The proposed work base has a plate-like or flat base body and a ledge projecting from the base body, the ledge having or forming a stop, for example for a kitchen worktop. By means of the ledge it is possible to align the work base on a kitchen worktop, for example, and to prevent the work base from moving unintentionally.

The proposed work base has an (integrated) holding device for holding a vessel, such as the container of a blender, or for suspending/hanging/hooking a vessel in the work base, in particular temporarily or during the preparation of food, in particular in such a way that the prepared food can be transferred or pushed directly from the work base into the vessel. For this purpose, the holding device is designed to hold the vessel laterally and/or at the rim, in particular in such a way that the work base only partially covers the vessel.

In accordance with one aspect, the work base is constructed as one piece and/or rigid and/or has no moving parts. It is particularly preferable that the holding device is integrated into the ledge and/or that the ledge forms the holding device. This enables a particularly robust and compact and/or simple design/construction. In addition, this type of construction allows for particularly easy cleaning of the work base.

The holding device is preferably arranged on a front face of the work base or ledge in order to suspend/hang/hook the vessel in the work base or ledge at the front or on a side facing a user.

In accordance with a particularly preferred embodiment, the holding device is at least essentially designed in the shape of a segment of a circle in order to reach/engage under a rim of a round vessel or hold a round vessel (at its rim), such as the container/receptacle of a kitchen appliance or a cooking pot.

The work base or holding device is preferably designed to hold the vessel from below or by means of a holding element as well as to support the vessel from above or by means of a stop at the top, in particular in such a way that the vessel is clamped and/or tilting of the vessel out of the holding device is prevented.

It is also preferred that the vessel can be secured against (accidental) removal/withdrawal from the holding device. For this purpose, the work base has a securing element which secures the vessel in the holding position, preferably by interlocking/form-fit, against being pulled out of or removed/withdrawn from the work base.

The securing element is preferably designed as a projection and protrudes centrally or, in the position of use of the work base, from above into the holding device or a mount of the holding device.

In the holding position of the vessel, the securing element engages in the vessel—from above and/or at the rim—or the securing element and the vessel are connected to each other by interlocking/form-fit, in particular in such a way that pulling out of or removing/withdrawing from the holding device is prevented.

It is thus preferred that the vessel in the holding device or holding position—apart from the necessary play—cannot be displaced or translationally moved, i.e. has no degree of translational freedom. The vessel is therefore preferably suspended/hung/hooked in a predefined holding position, in which the relative position of the vessel to the work base is fixed.

To release/detach the vessel from the holding device, the vessel has to be tilted relative to the work base, in particular in such a way that the rim of the vessel slides past the securing element and the vessel can be pulled out of the holding device—in the tilted state.

In this way, a particularly simple and safe handling of the work base is enabled or supported. In particular, the risk of accidentally releasing/detaching the vessel from the holding device is reduced.

The proposed system has such a work base and a preferably pot-shaped vessel. In this way, corresponding advantages are realized, so that a repeated description of them is omitted.

The above-mentioned aspects and features of the technology as well as the aspects and features of the present technology resulting from the claims and the following description can in principle be realized independently of each other, but also in any combination.

BRIEF DESCRIPTION OF THE DRAWINGS

Further aspects, advantages, features and properties of the present technology result from the claims and the following description of a preferred embodiment with reference to the drawings. It shows:

DETAILED DESCRIPTION

In the partly not to scale, only schematic figures, the same reference signs are used for identical or similar parts and components, resulting in corresponding or comparable properties and advantages, even if a repeated description is omitted.

Figure 1:
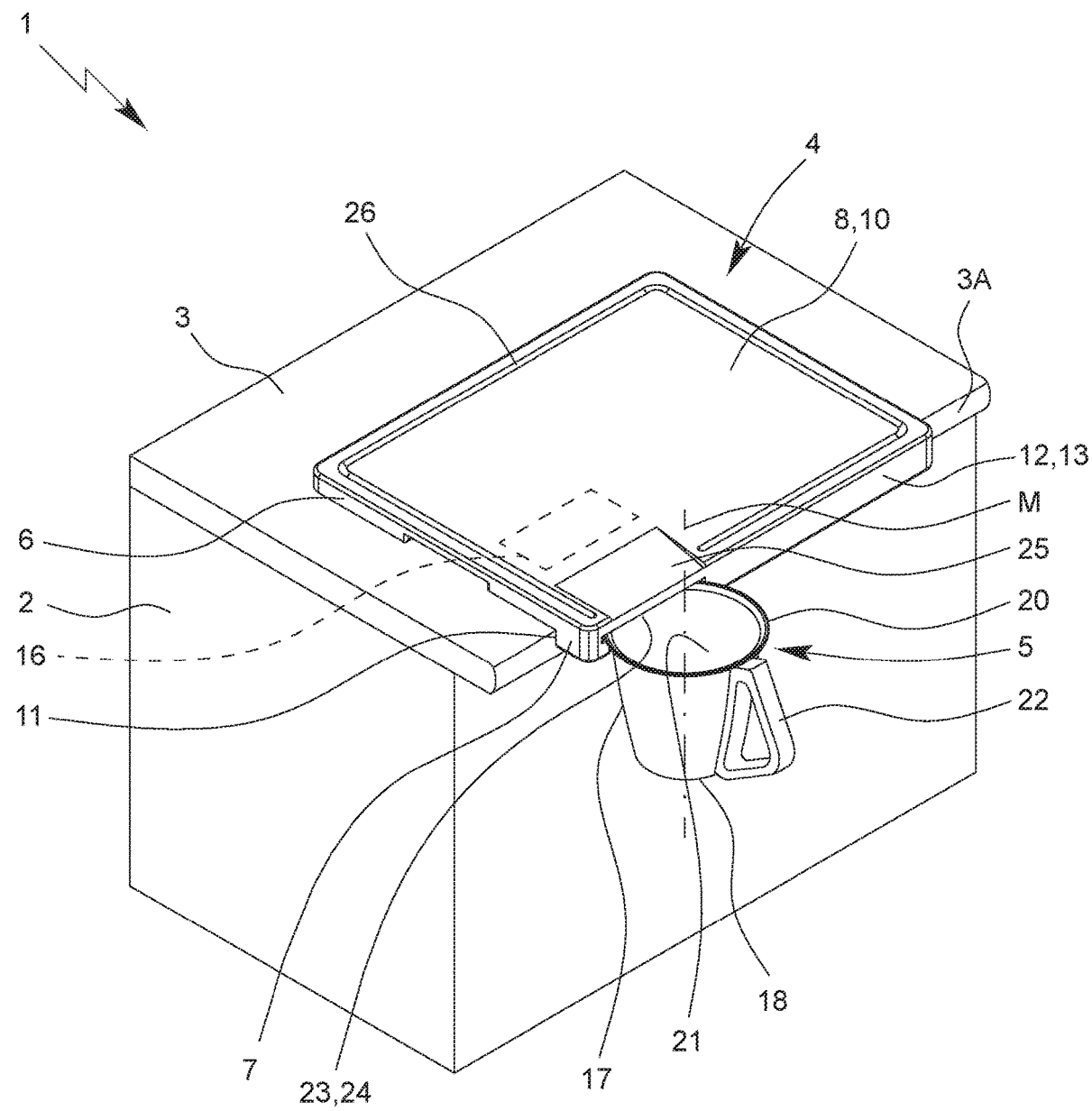
FIG. 1 is a perspective view of a proposed system with a proposed work base and a vessel suspended in the work base.

FIG. 1 shows schematically a proposed system 1 in a kitchen with a base cabinet 2 and a worktop 3 mounted on the base cabinet 2. However, the system 1 can also be used for other purposes or in another environment, for example in a laboratory.

The system 1 has a proposed work base 4, a vessel 5 and optionally the worktop 3.

The illustration in FIG. 1 shows system 1 and/or work base 4 in the usual position of use and vessel 5 in the holding position.

The position of use of work base 4 is the (spatial) orientation/position of the work base 4, in which the work base 4 is essentially resting on the worktop 3 and/or in which the work base 4 is aligned horizontally.

The holding position of the vessel 5 is the (spatial) orientation/position of the vessel 5, in which the vessel 5 is held by the work base 4, as explained in more detail below.

The system 1 is in particular designed as a kitchen system or is intended for use in a kitchen. For example, the system 1 can form part of a kitchen, in particular of a kitchen unit or kitchen block, with the worktop 3 being designed as a kitchen worktop on which work base 4 is placed.

As already explained at the outset, the work base 4 is preferably designed as a cutting board for cutting food. In particular, work base 4 serves to protect worktop 3 when preparing food. However, other possible applications are also conceivable.

Work base 4 may be made entirely or partly of plastic, wood, glass, stone or ceramic. However, it is preferable that work base 4 is made of a single material and is formed in one piece.

The work base 4 has a particularly plate-like and/or cuboidal base body 6 and a bar/ledge 7 which projects from the base body 6, in particular downwards in the position of use of the work base 4.

Preferably, the base body 6 and the ledge 7 are made in one piece. However, it is also possible that the ledge 7 is a separate component which is attached to the base body 6 by a form-fit, force-fit and/or bonding, in particular by screwing and/or gluing. For example, it is possible to mount ledge 7 on a conventional cutting board to obtain the proposed work base 4.

The work base 4 or the base body 6 has a top side 8 and a bottom side 9, wherein in the position of use of the work base 4 the bottom side 9 is located at the bottom or faces the worktop 3 and the top side 8 is located at the top or faces away from the worktop 3.

The work base 4 has a preferably at least substantially rectangular work surface 10, wherein the work surface 10 is formed by the top side 8 or by a part of the top side 8 of the base body 6.

The top side 8 or work surface 10 is arranged preferably at least essentially parallel to the bottom side 9 of the work base 4. However, solutions are also possible in which the top side 8 or work surface 10 is completely or partially or in some areas inclined relative to the bottom side 9, as explained in more detail below.

The ledge 7 is preferably designed as an elongated projection and protrudes from the bottom side 9 or downwards in the position of use of the work base 4.

In the embodiment shown, the ledge 7 extends over the entire width and/or entire front of the work base 4. However, other solutions are also possible, for example wherein the ledge 7 is formed by a plurality of projections spaced apart from each other.

The ledge 7 has an inner side 11 and an outer side 12, wherein the inner side 11 in the position of use of the work base 4 rests against a front side 3A of the worktop 3 or forms a stop for the worktop 3.

The inner side 11 and the outer side 12 are at least essentially perpendicular to the top side 8 and/or the bottom side 9 of the base body 6.

The work base 4 has—on a side facing a user in the position of use of work base 4—a front face 13, the outer side 12 of the ledge 7 forming the front face 13.

The work base 4 can be aligned relative to the worktop 3 by means of the ledge 7 by pushing the ledge 7 against the worktop 3. In particular, the ledge 7 prevents the work base 4 from accidentally being pushed backwards or away from the user during use.

Figure 2:
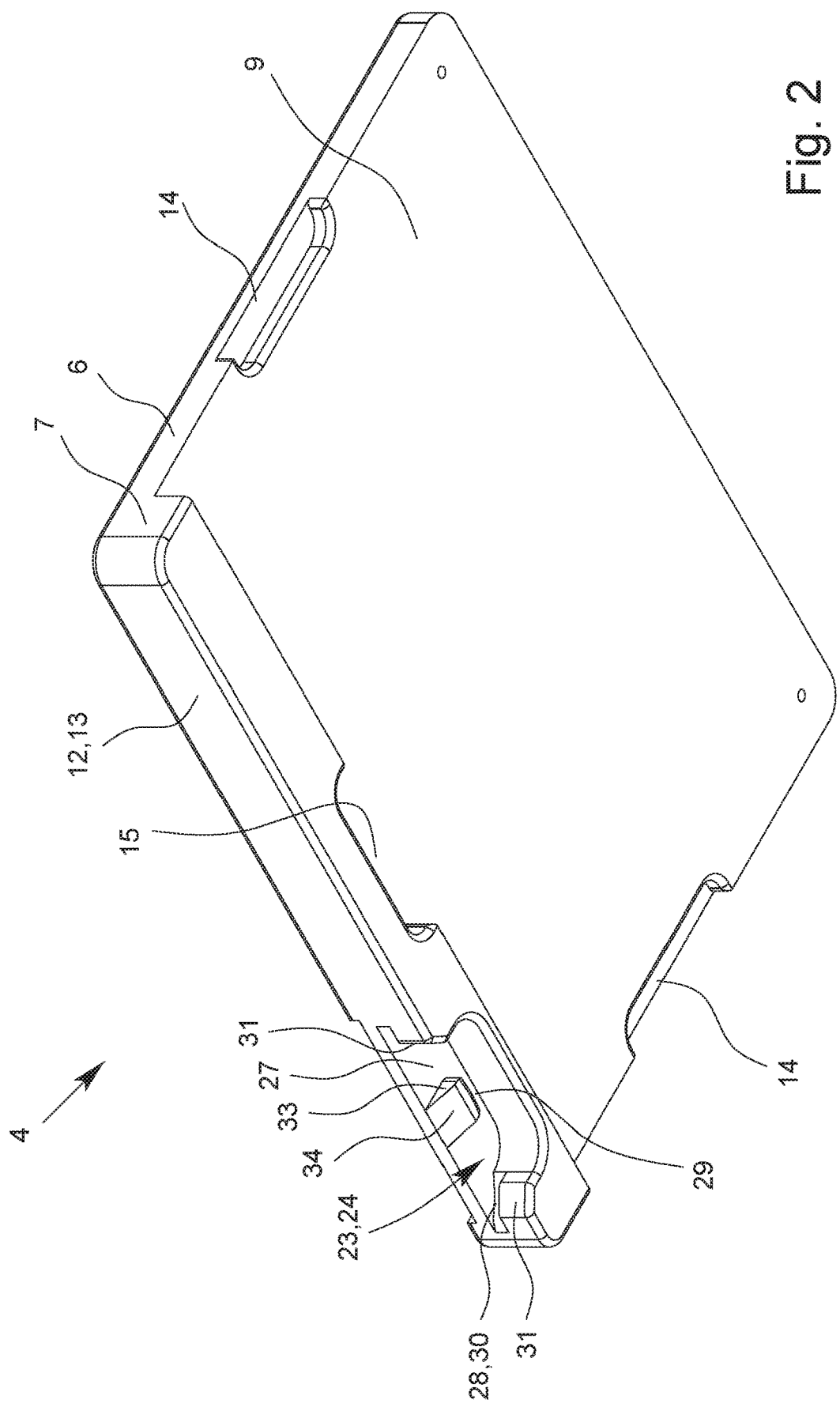
FIG. 2 is a perspective view of the work base from below.

Optionally, the work base 4 is equipped with one or more handles 14, 15 to simplify the handling of the work base 4, as illustrated in particular in FIG. 2.

In the embodiment shown, the work base 4 has two side handles 14 and one front handle 15, wherein the side handles 14 are each formed by a recess in the base body 6 and/or the bottom side 9 and the front handle 15 by a recess in the ledge 7.

As indicated by dashed lines in FIG. 1, the work base 4 may have a balance/scale 16, preferably with the balance/scale 16 integrated into the work surface 10. In particular, the work base 4 may be equipped with one or more pressure sensors, for example to determine on a specific or predefined area of the work base 4 the weight of food prepared or to be prepared.

The balance/scale 16 can have a display (not shown) to show a user the weight. In addition or alternatively, the work base 4 may be electronically, in particular wirelessly, connectable to an external device, such as a mobile phone, to transmit and display relevant data on the external device.

As already explained at the outset, the work base 4 is designed to hold the vessel 5, particularly preferably laterally or at the edge/rim or off-center.

The vessel 5 can be suspended/hung/hooked in the ledge 7 and/or in the front face 13 of the work base 4, on a side facing a user.

The vessel 5 is preferably a kitchen utensil or part of a kitchen utensil, such as a blender or the receptacle of a blender, a cooking pot, a steamer basket or the like.

In the embodiment shown, the vessel 5 is at least essentially round and/or cylindrical. However, other embodiments are also possible in which the vessel 5 is at least essentially rectangular.

The vessel 5 has a wall 17 and a bottom 18 which define/delimit an interior (space) 19 at the sides and bottom respectively.

The vessel 5 has an in particular collar-like edge/rim 20, wherein the rim 20 defines an opening 21 of the vessel 5 laterally and/or radially. The rim 20 is preferably formed by the wall 17 or a beaded edge of the wall 17.

Optionally, the vessel 5 is equipped with a handle 22 to facilitate/simplify the handling of the vessel 5.

The vessel 5 has a central axis M, the central axis M passing centrally through opening 21 and/or interior 19 and/or being equidistantly spaced from the rim 20, as indicated in FIG. 1.

Preferably, the central axis M is a longitudinal and/or symmetry axis of the preferably elongated and/or at least substantially rotationally symmetrical vessel 5 or the preferably at least substantially circular rim 20.

As already explained, FIG. 1 shows the system 1 or the work base 4 in the position of use with the vessel 5 suspended, in which the work base 4, in particular the bottom side 9, rests flat on the worktop 3 and the inner side 11 of the ledge 7 rests against the front side 3A of the worktop 3.

The vessel 5 is in the holding position in which the vessel 5 is (completely) suspended/hung/hooked in the work base 4. The hanging in and out/hooking and unhooking of the vessel 5 is explained in more detail later with reference to FIGS. 6 and 7.

In the holding position, the vessel 5 is held at the rim by the work base 4, in particular by the ledge 7. In particular, in the holding position, the central axis M or the center of gravity of the vessel 5 is at a distance, preferably more than 3 cm or 5 cm, from the work base 4 or the ledge 7.

The work base 4 or the work surface 10 only partially covers the opening 21 in the holding position. It is preferred that in the holding position less than 50%, preferably less than 40% or 25%, of the opening 21 is covered by the work base 4 or work surface 10. In this way an easy introduction or transfer of food into the vessel 5 is ensured.

The (empty) vessel 5 preferably weighs more than 0.5 kg or 1 kg and/or less than 4 kg or 3 kg and has a capacity of more than 1 liter or 1.5 liters and/or less than 4 liters or 3 liters.

The weight of the vessel 5 in the filled state depends largely on the weight of the filled content.

The work base 4 is designed/dimensioned in such a way that even if the vessel 5 is (fully) filled—for example with a total weight of more than 3 kg or 4 kg—the system 1 or the work base 4 with suspended vessel 5 will not tip over in the position of use.

Consequently, the center of gravity of the system 1, thus of the work base 4 with suspended vessel 5, is not horizontally spaced from the worktop 3, even when the vessel 5 is (fully) filled—for example with water—but is always in or vertically below the base body 6 in the position of use.

Against this background, the weight of the work base 4 is more than 2 kg or 3 kg, preferably more than 4 kg or 5 kg, in particular more than 7 kg, and/or less than 20 kg or 15 kg.

In order to distance the center of gravity of the work base 4 as far as possible from the ledge 7, the base body 6 and/or work surface 10 preferably has a depth of more than 300 mm or 400 mm and/or less than 900 mm or 600 mm.

In a preferred embodiment, the work base 4 has an (additional) weight in order to increase the distance between the center of gravity of work base 4 and ledge 7. For example, the weight may be in the form of a metal core embedded in work base 4 and/or may be in the form of a ledge or bar fixed on the side of work base 4 opposite to the ledge 7.

The width of the base body 6 and/or the work surface 10 is preferably more than 200 mm or 300 mm, in particular more than 400 mm, and/or less than 800 mm, in particular less than 700 mm or 600 mm, however other widths are possible and envisioned.

Preferably, the base body 6 has a thickness of more than 10 mm, in particular more than 20 mm, and/or less than 50 mm or 40 mm, however other thicknesses are possible and envisioned.

According to an alternative embodiment (not shown) the work base 4 is designed or light/small dimensioned in such a way that it can be hung on the vessel 5, i.e. the vessel 5 holds the work base 4 in the holding position. In this case, it is possible to lift the work base 4 (together with the cut material/food) and fix it to the vessel 5 in order to transfer the cut material/food directly from the work base 4 to the vessel 5 in a particularly simple manner. Optionally, the work base 4 weighs less than 1 kg in such an embodiment in order to prevent the vessel 5 from tipping over when the work base 4 is suspended.

In the holding position and/or in the position of use, the vessel 5 or the opening 21 of the vessel 5 is arranged (vertically) below the work surface 10 and/or (vertically) at a distance from the work surface 10, in particular in such a way that food can be pushed or transferred from the work surface 10 into the vessel 5.

As already explained at the outset, the work base 4 has a holding device 23 for suspending/holding the vessel 5, wherein the ledge 7 forms the holding device 23 or the holding device 23 is integrated into the ledge 7.

Particularly preferably, the holding device 23 has a support/opening/mount 24 for receiving the vessel 5, preferably wherein the support/opening/mount 24 is formed by a recess in the ledge 7, in particular on the outer side 12 of the ledge 7. The support/opening/mount 24, for example, can be milled into the ledge 7.

In the embodiment shown, the work base 4 only has one holding device 23. However, embodiments are also possible in which the work base 4 has a plurality of holding devices 23. For example, in such an embodiment, a plurality of holding devices 23 may be distributed along the ledge 7 and/or several holding devices 23 may be differently dimensioned to hold a plurality of vessels 5 and/or vessels 5 of different sizes and/or shapes.

It is preferable that the entire work base 4, i.e. the base body 6, the ledge 7 and the holding device 23, is or are constructed in one piece. In particular, the work base 4 is rigid and/or has no moving parts. This enables a very compact and robust design/construction of the work base 4.

Preferably, the holding device 23 is arranged off-center and/or in the region of one corner of the work base 4 (in the illustration according to FIG. 1 in the region of the left-hand corner). In this way, working on or at the work base 4 is not or not significantly impaired by the suspended vessel 5.

Optionally, the work surface 10 is inclined in the region of the holding device 23. In the embodiment shown, the work base 4 is equipped with a transfer slope/bevel 25, which is inclined to the front face 13 in the region/area of the holding device 23, in order to facilitate/simplify feeding or transferring of the prepared food into the vessel 5.

In addition, the work base 4 may have a channel/groove 26 running along the edge of the top side 8 and/or delimiting the work surface 10 laterally or at the sides. Liquids can collect in the channel/groove 26, in particular to protect the worktop 3 from contamination.

Preferably, the channel/groove 26 is interrupted in the area of the holding device 23 and/or the transfer slope 25, so that the feeding/transferring of the prepared food into the vessel 5 is not hindered.

Furthermore, the work base 4 can have a positioning aid for the vessel 5 (not shown), wherein the positioning aid can be designed as a (circular) depression in the work surface 10.

In the following, the preferred design/construction of the holding device 23 is explained in more detail with reference to FIGS. 2 to 5. Subsequently, hooking/hanging in and out of the vessel 5 into or out of the holding device 23 is explained with reference to FIGS. 6 and 7.

Figure 3:
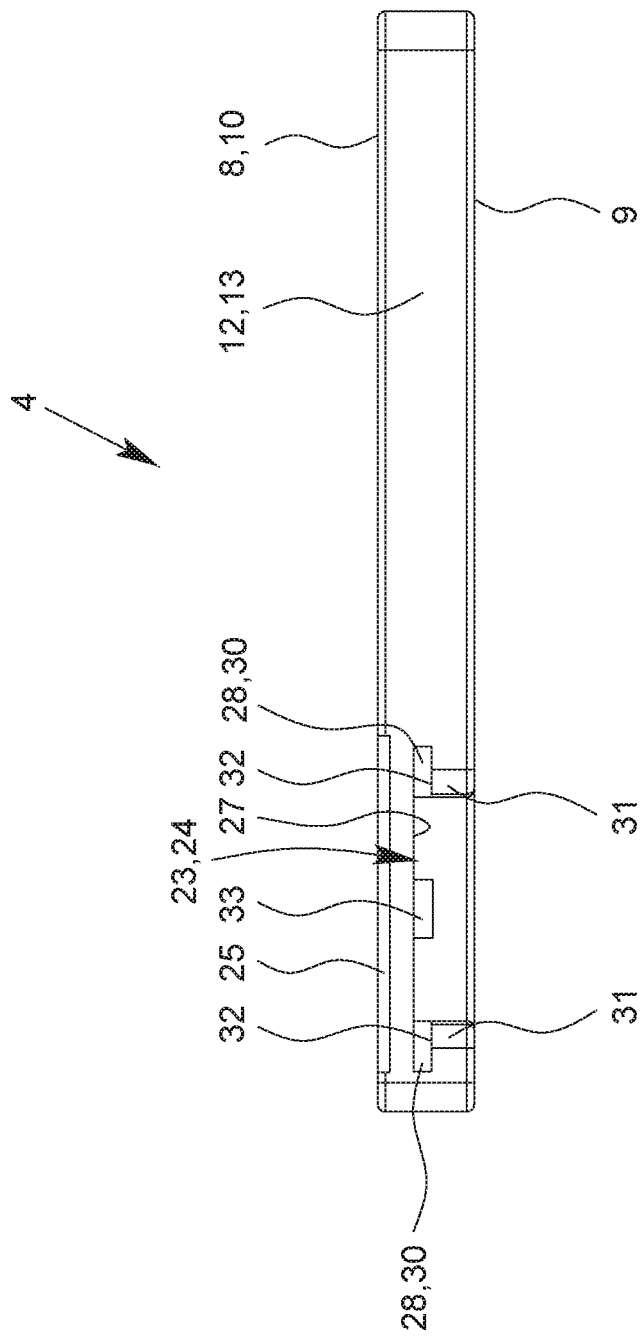
FIG. 3 is a schematic view of the work base from the side.
Figure 4:
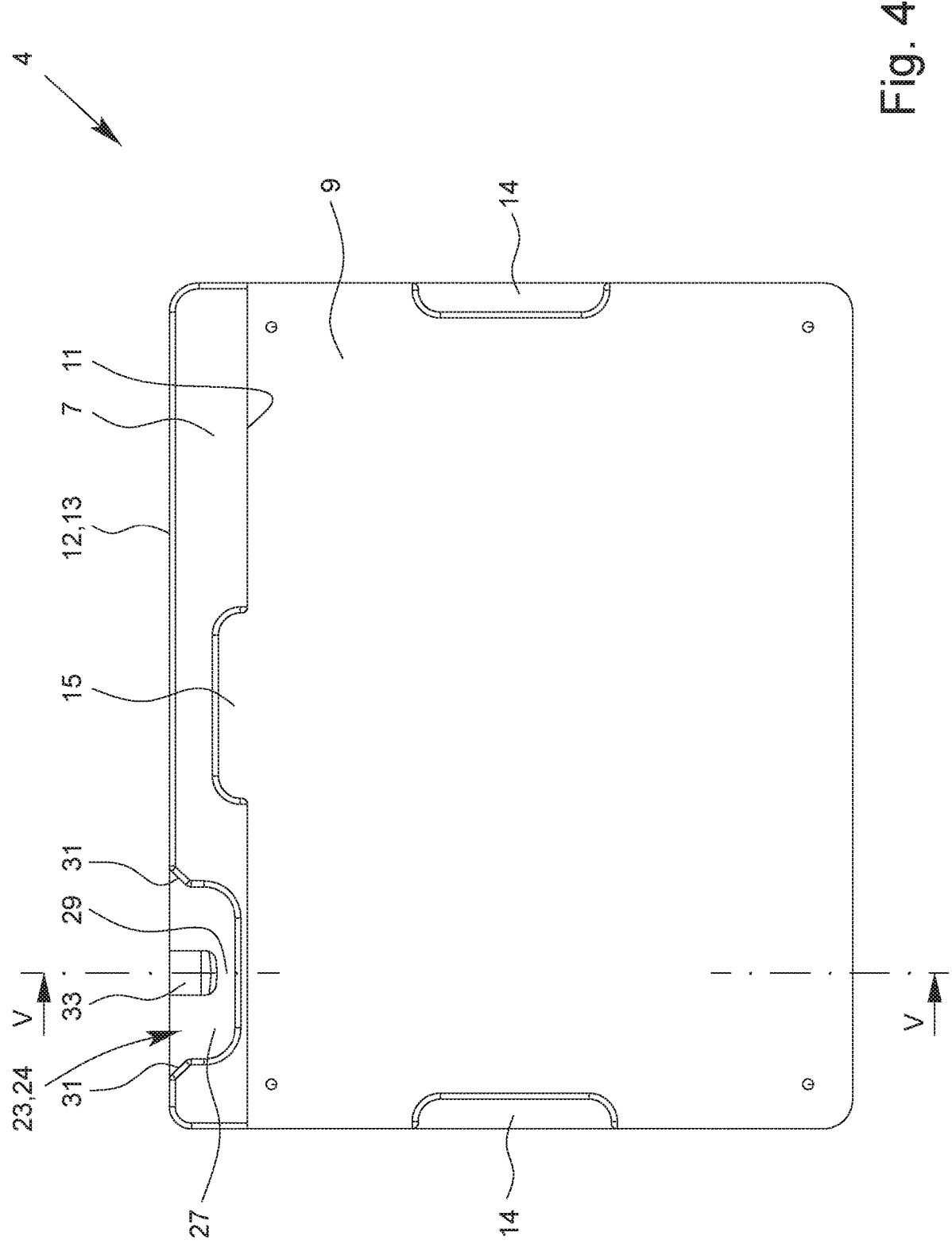
FIG. 4 is a schematic view of the work base from below.
Figure 5:
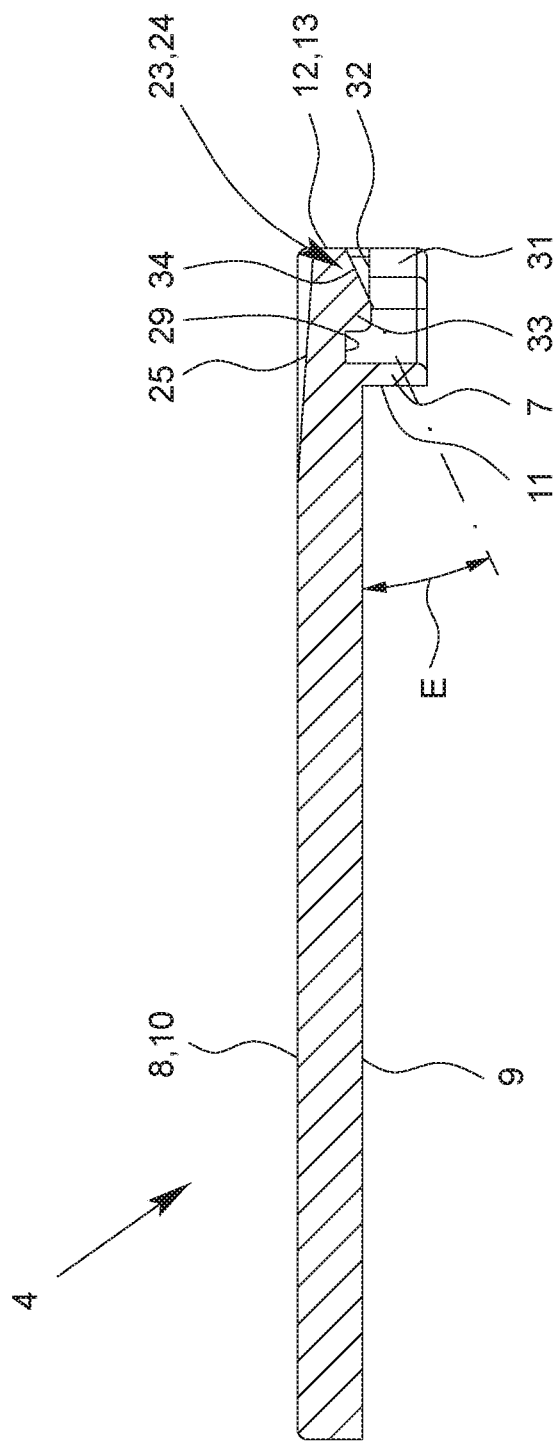
FIG. 5 is a schematic section of the work base along the cutting line V-V drawn in FIG. 4.

FIG. 2 is a perspective view of the work base 4 from below. FIG. 3 is a schematic view of the work base 4 from the side. FIG. 4 is a schematic view of the work base 4 from below. FIG. 5 shows a schematic section of the work base 4 along cutting line V-V drawn in FIG. 4.

The holding device 23 is preferably formed by the ledge 7. In particular, the mount 24 for receiving the vessel 5 is delimited laterally and from above and/or toward the work surface 10 by the ledge 7 and/or by the base body 6.

The holding device 23 and/or the mount 24 is preferably—in the position of use of the work base 4—open toward the front and the bottom and/or at a side facing away from the work surface 10 to allow the vessel 5 to be suspended/hooked/hung.

As already explained, the holding device 23 and/or the mount 24 is preferably designed in the shape of a segment of a circle and/or is designed to receive/accommodate an at least substantially round vessel 5, such as the container of a blender.

The diameter of the holding device 23 and/or mount 24 preferably corresponds at least substantially to the outside diameter of the vessel 5, in particular of the rim 20.

Preferably the holding device 23 or mount 24 and/or the vessel 5 or its opening 21 has a diameter of more than 100 mm or 120 mm, in particular more than 140 mm, and/or less than 300 mm or 260 mm, in particular less than 220 mm.

The holding device 23 has a cover side 27 and at least one, in the embodiment shown two, edge sides 28, the cover side 27 delimiting the mount 24 at the top and/or toward the work surface 10 and the edge sides 28 delimiting the mount 24 at the sides.

The cover side 27 is facing away from the work surface 10 and in the embodiment shown is arranged directly below the optional transfer slope 25.

The cover side 27 forms a stop for the vessel 5, in particular the rim 20, toward the top and/or the work surface 10, hereinafter referred to as top stop 29.

By means of the cover side 27 and/or the top stop 29 the vessel 5 can be held in such a way that the opening 21 is aligned at least substantially horizontally and tilting of the opening 21 toward the front is prevented or limited.

In particular, tilting moments of vessel 5 can be absorbed by the cover side 27 and/or the top stop 29, in such a way that vessel 5 is secured against falling out of the holding device 23.

The edge sides 28 each form a stop for the vessel 5, in particular the rim 20, in and transversal to the direction of insertion and/or in a direction parallel to the ledge 7, hereinafter referred to as lateral stop 30.

In other words, the cover side 27 and the edge sides 28 limit the movement of the vessel 5 in the holding position upwards, in the direction of insertion and transversely to the direction of insertion or towards the sides.

The holding device 23 has at least one holding element 31, preferably with the holding element 31 projecting laterally and/or from the edge side 28 into the mount 24.

The holding element 31 is designed to grip or engage under the rim 20 and/or forms a stop for the vessel 5, in particular the rim 20, downwards or towards the bottom or in a direction opposite to the work surface 10, hereinafter referred to as bottom stop 32.

The movement of the vessel 5 in the holding position is therefore limited downwards by the holding element 31.

In the embodiment shown, the holding element 31 is formed by a projection, preferably wherein the holding element 31 is formed in one piece with the ledge 7. However, structural solutions are also possible in which the holding element 31 is formed by a separate component. For example, the holding element 31 can be designed as a pin that is inserted or screwed into a corresponding recess/hole in the ledge 7.

In the embodiment shown, the holding device 23 has two opposite edge sides 28 and two holding elements 31. However, other solutions are also possible here. The following embodiments concerning one edge side 28 and/or one holding element 31 apply accordingly to the other edge side 28 and/or the other holding element 31.

As illustrated in particular by the side view according to FIG. 3, the holding element 31 is (vertically) spaced from the cover side 27, preferably by more than 5 mm and/or less than 20 mm or 15 mm and/or in such a way that between holding element 31 and cover side 27 the rim 20 of vessel 5 can be received/accommodated—in particular with a clearance of at least 2 mm and/or at most 10 mm.

For this purpose, the distance between the cover side 27 and the holding element 31 or the bottom stop 32 is greater than the thickness of the rim 20, preferably by more than two or three times. In this way the vessel 5 can be inserted into the holding device 23 particularly easily and/or without getting jammed.

Optionally, the cover side 27 is inclined and/or the mount 24 tapers towards the rear and/or in the direction of insertion (not shown), in particular to align the vessel 5 during insertion.

In addition or alternatively, the top stop 29 (at least at the rear) is formed by an elevation, such as a projection of the cover side 27 (not shown).

In this way, the (vertical) distance between the top stop 29 and the holding element 31 or the bottom stop 32 may be smaller than the (vertical) distance between the surface of the cover side 27 directly opposite the holding element 31 and the holding element 31 and/or may be at least substantially equal to the thickness of the rim 20. This makes it possible to align vessel 5 or its central axis M in the holding position—despite the greater distance between holding element 31 and cover side 27—(exactly) vertically and/or to hold it in such a way that the plane formed by the opening 21 is aligned (exactly) parallel to the work surface 10 and/or the central axis M is aligned (exactly) orthogonal to the work surface 10.

The work base 4 has a securing element 33, wherein the securing element 33 secures the vessel 5 against being (inadvertently) pulled out of or removed/withdrawn from the holding device 23 or the mount 24.

As in particular FIG. 2 and the schematic section according to FIG. 5 illustrate, the securing element 33 projects—preferably at least substantially centrally, from above and/or from a side facing away the work surface 10—into the holding device 23 or the mount 24 and/or from the cover side 27. In particular, the securing element 33 protrudes downwards or toward the bottom in the position of use of work base 4.

The securing element 33 is preferably formed by a projection of the cover side 27 to form an (inner) stop for the vessel 5, in particular the rim 20.

It is preferable that the securing element 33 is formed in one piece with the holding device 23 or the cover side 27. However, other solutions are also possible here.

In the holding position, the securing element 33 engages in the vessel 5—preferably from above and/or at the rim—and in this way secures the vessel 5 by interlocking/form-fit against being (horizontally) pulled out of or removed/withdrawn from the holding position or holding device 23, as explained in more detail below.

The securing element 33 is preferably wedge-shaped and/or has an optional insertion bevel 34 for the vessel 5, as illustrated in particular in FIGS. 2 and 5.

The insertion bevel 34 forms a guide or sliding surface for the vessel 5 or the rim 20 to make it easier to suspend/hang/hook or push/insert the vessel 5 into the holding device 23.

The insertion bevel 34 is inclined relative to the work surface 10 and/or cover side 27, preferably by an insertion angle E of more than 10° or 20° and/or less than 40° or 30°.

By means of the insertion bevel 34 of the securing element 33, the vessel 5 is thus tilted when it is inserted or pushed into the holding device 23 or mount 24, as described in more detail below with reference to FIGS. 6 and 7.

Figure 6:
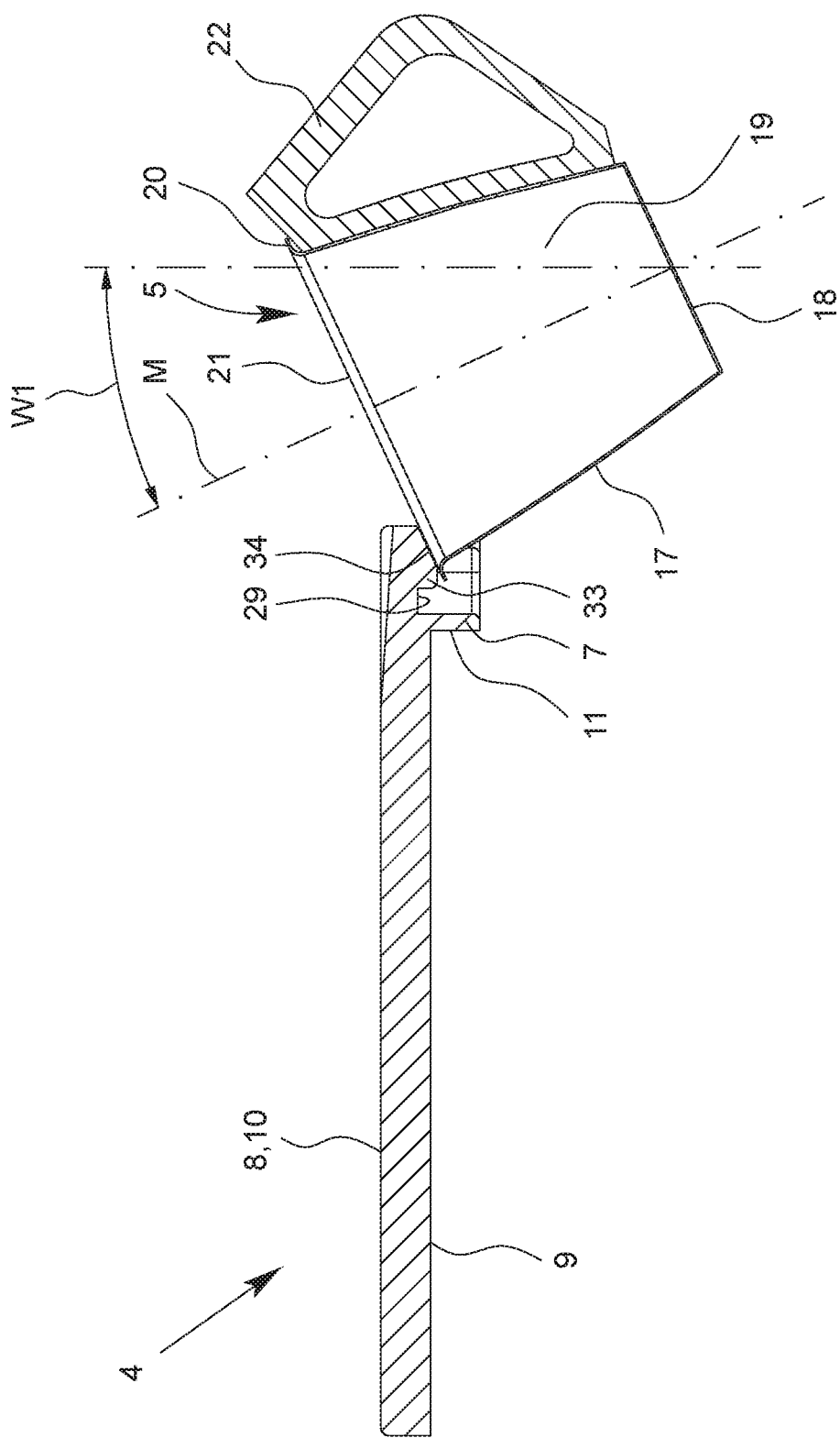
FIG. 6 is a schematic section of the work base according to FIG. 5 when suspending the vessel.

FIG. 6 shows the work base 4 when hanging/hooking the vessel 5 into the work base 4, wherein the vessel 5 is tilted relative to the work base 4, thus the angle enclosed between the work surface 10 and the central axis M is less than 90°. FIG. 7 shows the holding position in which the vessel 5 is fully hooked/hung into or fully suspended in the work base 4.

In order to suspend/hang/hook the vessel 5 in the work base 4, the rim 20 of the vessel 5 is pushed/inserted into the holding device 23 or the mount 24, more precisely into the gap between the holding elements 31 and the cover side 27.

By means of the insertion bevel 34 of the securing element 33, the rim 20 is pushed down-wards when inserting the vessel 5 into the work base 4 and/or the vessel 5 is tilted relative to the work base 4, as shown in FIG. 6. This reduces the angle enclosed between the central axis M of the vessel 5 and the work surface 10 and/or increases the angle enclosed between the central axis M and the vertical until the tilt angle W1 is obtained.

The tilt angle W1 is the angle enclosed between the central axis M of vessel 5 and the vertical or the perpendicular to the work surface 10, which is required to suspend/hang/hook and hang out/unhook vessel 5 in or from work base 4. In particular, the tilt angle W1 is the angle by which the vessel 5—starting from the vertical orientation—must be tilted relative to the work base 4 in order to be able to slide past the securing element 33. The size of the tilt angle W1 is therefore dependent on the height of securing element 33.

In this case, the tilt angle W1 corresponds to the insertion angle E defined by the insertion bevel 34.

Preferably, the tilt angle W1 adjusts automatically by means of the insertion bevel 34 when the vessel 5 is inserted into the work base 4.

The tilt angle W1 is smaller than 90° or 60°, in particular smaller than 45°, in order to reduce the risk that liquids, cuttings or the like escape when the vessel 5 is hung/hooked in or hung out/unhooked. Especially preferably, the tilt angle W1 is greater than 10° and smaller than 30°.

While the vessel 5 is being inserted into the holding device 23, the rim 20 of the vessel 5 is held from below by the holding elements 31 or the bottom stops 32 formed by them.

As soon as the vessel 5 is completely inserted into the holding device 23 or mount 24, thus the rim 20 being pushed behind the securing element 33 and/or touching the edge sides 28 on both sides, the vessel 5 can be released and/or the angle enclosed between the central axis M and the work surface 10 can be increased (again).

The vessel 5 can subsequently assume the holding position and/or can be aligned in such a way that the plane formed by the opening 21 is at least substantially parallel to the plane formed by the work surface 10 and/or that a holding angle W2 is formed between the work surface 10 and the central axis M.

Figure 7:
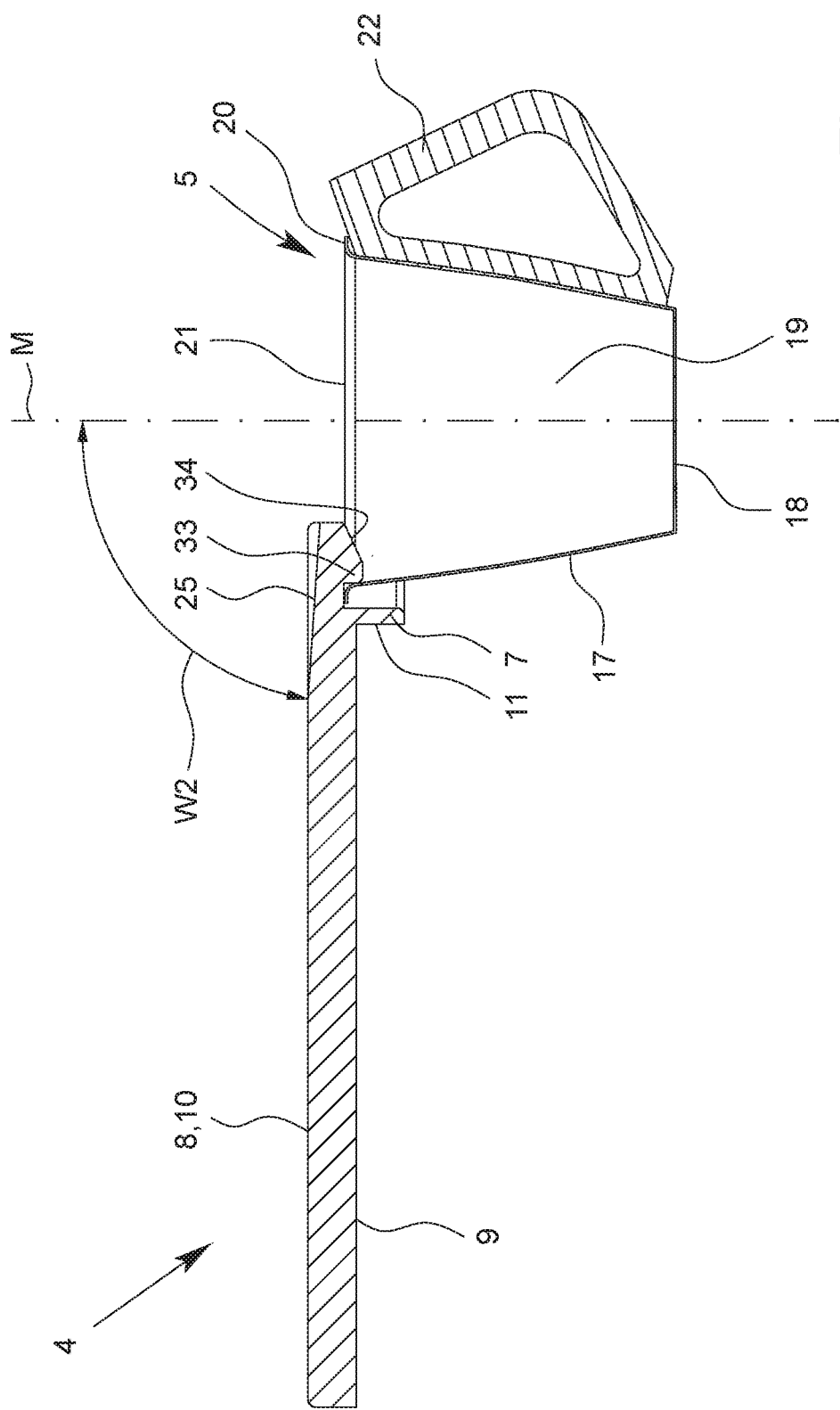
FIG. 7 is a schematic section of the work base according to FIG. 5 with the (completely) suspended vessel.

FIG. 7 shows the system 1 in the holding or end position, in which the vessel 5 is fully inserted into the work base 4 and the angle between the work surface 10 and the central axis M corresponds to the holding angle W2.

The holding angle W2 is the angle enclosed between the central axis M of the vessel 5 and the work surface 10 in the holding position. Preferably, the holding angle W2 is at least essentially 90° in the holding position, especially preferably exactly 90°.

In the holding position, the vessel 5 is secured by means of the securing element 33 in an interlocking/form-fitting manner against (linear or translational) pulling out or removal/withdrawal.

In order to detach/release the vessel 5 from the work base 4, in particular the holding device 23, the vessel 5 has to be tilted relative to the work base 4 or on the holding elements 31 in such a way that the tilt angle W1 is reached and/or the rim 20 of the vessel 5 can slide past the securing element 33.

For hanging out/unhooking, the vessel 5 has to be tilted until the securing element 33 no longer engages in the vessel 5 or the opening 21. Then the vessel 5—in the tilted position—can be pulled out of or withdrawn from the holding device 23 or mount 24 and thus be detached/released from the work base 4.

Figure 8:
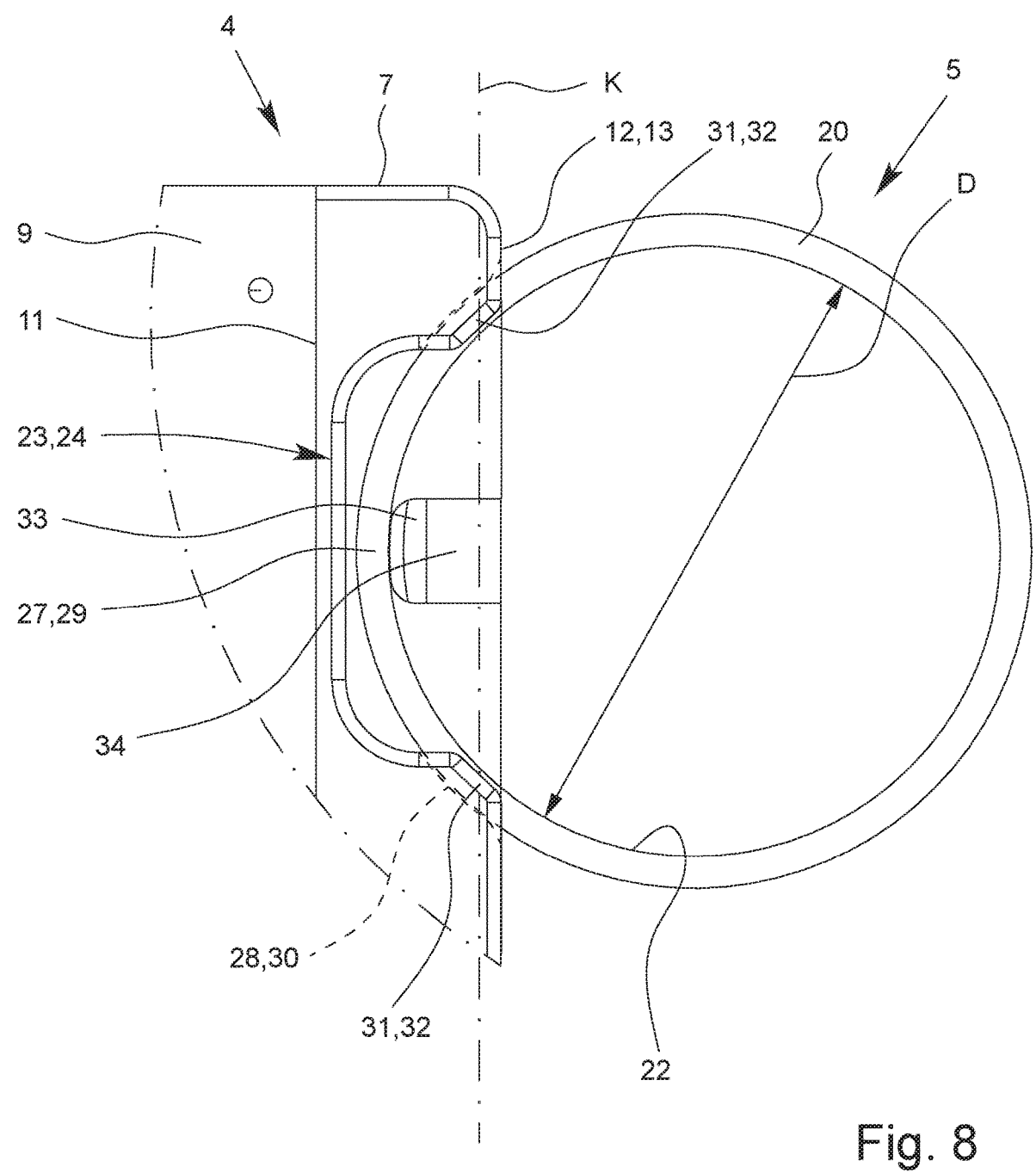
FIG. 8 is a schematic view of the work base in the area of a holding device with the vessel only partially shown.

FIG. 8 shows the work base 4 in the region of the holding device 23 from below and with the vessel 5, which is only indicated schematically here, in the holding position.

FIG. 8 illustrates that the vessel 5 is held or supported by a plurality of, preferably at least three or four, stops in or by the work base 4 or the holding device 23, in particular the stops being spaced from the center of gravity or the central axis M of the vessel 5 or being arranged in a segment of the circle of the circular opening 21.

As already explained, the two holding elements 31 each form a first stop, namely the bottom stop 32 for the vessel 5.

Since the two holding elements 31 hold the rim 20 of the vessel 5 off-center, thus an imaginary connecting line between the holding elements 31 or the bottom stops 32 being smaller than the diameter D of the vessel 5 or its opening 21, the weight force of the vessel 5 generates a tilting moment about a tilting axis K defined by the stops 32.

The tilting axis K runs in the region of the holding elements 31, eccentrically through the opening 21 and/or at least essentially parallel to the front face 13 of the work base 4. The tilting axis K is only indicated schematically in FIG. 8, since its course depends on the support points of the rim 20 on the holding elements 31 and can shift when the vessel 5 is inserted and removed.

The cover side 27 of the holding device 23 forms a second stop, namely the top stop 29 for the rim 20 of vessel 5, in particular to absorb the tilting moment or to secure vessel 5 against tilting about the tilting axis K.

The edge sides 28 each form a third stop, namely the lateral stop 30 for the rim 20 of vessel 5 in the direction of insertion and preferably also transversely to this direction.

In addition, the securing element 33 forms a fourth stop, namely the inner stop for the rim 20 in a direction opposite to the direction of insertion.

In this way the vessel 5 is secured in the holding position—except for the (necessary) play—against translational or linear movement. In the holding position, vessel 5 thus has no degree of translational freedom, particularly due to the top stop 29, the lateral stops 30, the bottom stops 32 and the securing element 33.

In the holding position, the vessel 5 can only be tilted relative to the work base 4 and/or rotated about the central axis M. In other words, only the orientation of the vessel 5 relative to the work base 4 can be changed in the holding position.

It is thus preferred that the vessel 5 can be detached/released from the holding device 23 (exclusively) by tilting it about the tilting axis K and then pulling it out.

Individual aspects and features of the present technology can be realized independently of each other, but also in any combination and/or sequence.

In particular, the present technology relates also to any one of the following aspects which can be realized independently or in any combination, also in combination with any aspects described herein:

1. Work base 4 with a work surface 10 and a holding device 23 for suspending a vessel 5,
wherein the work base 4 has a plate-like base body 6 and a ledge 7 projecting from the base body 6, the ledge 7 forming the holding device 23, and
wherein the work base 4 has a securing element 33 to secure the vessel 5 against being pulled out of the holding device 23.

2. Work base according to aspect 1, characterized in that the work base 4 is formed in one piece.

3. Work base according to aspect 1 or 2, characterized in that the holding device 23 has a holding element 31 for engaging under a rim 20 of the vessel 5.

4. Work base according to one of the preceding aspects, characterized in that the holding device 23 is designed in the form of a circular segment and/or for holding a round vessel 5.

5. Work base according to one of the preceding aspects, characterized in that the holding device 23 is arranged on a front face 13 of the work base 4.

6. Work base according to one of the preceding aspects, characterized in that the work base 4 comprises a scale 16, the scale 16 being integrated into the work surface 10 and/or into the holding device 23.

7. Work base according to one of the preceding aspects, characterized in that the holding device 23 has a top stop 29 for the vessel 5 to secure the vessel 5 against tilting.

8. Work base according to one of the preceding aspects, characterized in that the securing element 33 is wedge-shaped.

9. Work base according to one of the preceding aspects, characterized in that the securing element 33 projects at least substantially centrally into a mount 24 of the holding device 23.

10. Work base according to one of the preceding aspects, characterized in that the work surface 10 is inclined in the region of the holding device 23 and/or has a transfer slope 25.

11. Work base according to one of the preceding aspects, characterized in that the work surface 10 has a channel/groove 26 at the edge, the channel/groove 26 being interrupted in the region of the holding device 23.

12. System 1 with a work base 4 and a preferably pot-shaped vessel 5, wherein the work base 4 has a holding device 23 for suspending the vessel 5, and wherein the work base 4 is designed according to one of the preceding aspects.

13. System according to aspect 12, characterized in that the vessel 5 is at least substantially round in shape and is suspended or suspendable in the holding device 23 at a rim 20 of the vessel 5.

14. System according to aspect 12 or 13, characterized in that the work base 4 has a preferably wedge-shaped securing element 33, wherein the securing element 33 engages in the vessel 5 in the holding position of the vessel 5—in particular from above and/or at the rim 20—and/or secures the vessel 5 in an interlocking/form-fitting manner against being pulled out of or removed/withdrawn from the holding device 23.

15. System according to one of aspects 12 to 14, characterized in that the vessel 5 can be detached/released from the holding device 23 (exclusively) by tilting the vessel 5 relative to the work base 4.

LIST OF REFERENCE SIGNS

1 System
2 Base Cabinet
3 Worktop
3A Front Side
4 Work Base
5 Vessel
6 Base Body
7 Ledge
8 Top Side
9 Bottom Side
10 Work Surface
11 Inner Side
12 Outer Side
13 Front Face
14 Side Handle
15 Front Handle
16 Balance/Scale
17 Wall
18 Bottom
19 Interior
20 Rim
21 Opening
22 Handle
23 Holding Device
24 Support/Opening/Mount
25 Transfer Slope
26 Channel/Groove
27 Cover Side
28 Edge Side
29 Top Stop
30 Lateral Stop
31 Holding Element
32 Bottom Stop
33 Securing Element
34 Insertion Bevel
D Diameter
E Insertion Angle
K Tilting Axis
M Central Axis
W1 Tilt Angle
W2 Holding Angle

The invention claimed is:
1. A work base comprising a work surface and a holding device for suspending a vessel,
wherein the work base is a cutting board having a ledge projecting from a base body, the ledge forming the holding device, wherein the holding device has a mount for receiving the vessel, the mount being formed by a recess in the ledge and being delimited laterally and toward the work surface by the ledge, and wherein the work base has a securing element to secure the vessel against being pulled out of the holding device.

2. The work base according to claim 1, wherein the work base is formed in one piece.

3. The work base according to claim 1, wherein the holding device has a holding element for engaging under a rim of the vessel.

4. The work base according to claim 1, wherein the holding device is designed in the form of a circular segment or for holding a round vessel.

5. The work base according to claim 1, wherein the holding device is arranged on a front face of the work base.

6. The work base according to claim 1, wherein the work base comprises a scale, the scale being integrated into at least one of the work surface or the holding device.

7. The work base according to claim 1, wherein the holding device has a top stop for the vessel to secure the vessel against tilting.

8. The work base according to claim 1, wherein the securing element is wedge-shaped.

9. The work base according to claim 1, wherein the securing element projects at least substantially centrally into the mount of the holding device.

10. The work base according to claim 1, wherein the work surface is inclined in a region of the holding device or has a transfer slope.

11. The work base according to claim 1, wherein the work surface has a channel and/or a groove at an edge, the channel and/or the groove being interrupted in region of the holding device.

12. A system comprising a work base and a vessel, wherein the work base has a work surface and a holding device for suspending the vessel, wherein the work base is a cutting board having a ledge projecting from a base body, the ledge forming the holding device, wherein the holding device has a mount for receiving the vessel, the mount being formed by a recess in the ledge and delimited laterally and toward the work surface by the ledge, and wherein the work base has a securing element to secure the vessel against being pulled out of the holding device.

13. The system according to claim 12, wherein the vessel is at least substantially round in shape and is suspended or suspendable in the holding device at a rim of the vessel.

14. The system according to claim 12, wherein the securing element engages in the vessel in a holding position of the vessel.

15. The system according to claim 12, wherein the securing element secures the vessel in an interlocking or form-fitting manner against being pulled out of or removed and/or withdrawn from the holding device.

16. The system according to claim 12, the securing element is at least one of being wedge-shaped or projecting into the mount of the holding device.

17. The system according to claim 12, wherein the vessel can be detached and/or released from the holding device by tilting the vessel relative to the work base.

18. The system according to claim 12, wherein the holding device has a holding element for engaging under a rim of the vessel.

19. The system according to claim 12, wherein the holding device is arranged on a front face of the work base.

20. The system according to claim 12, wherein the holding device has a top stop for the vessel to secure the vessel against tilting.

* * * * *